(No Model.)
C. L. BELLAMY.
ICE CREAM FREEZER.
No. 475,748. Patented May 31, 1892.
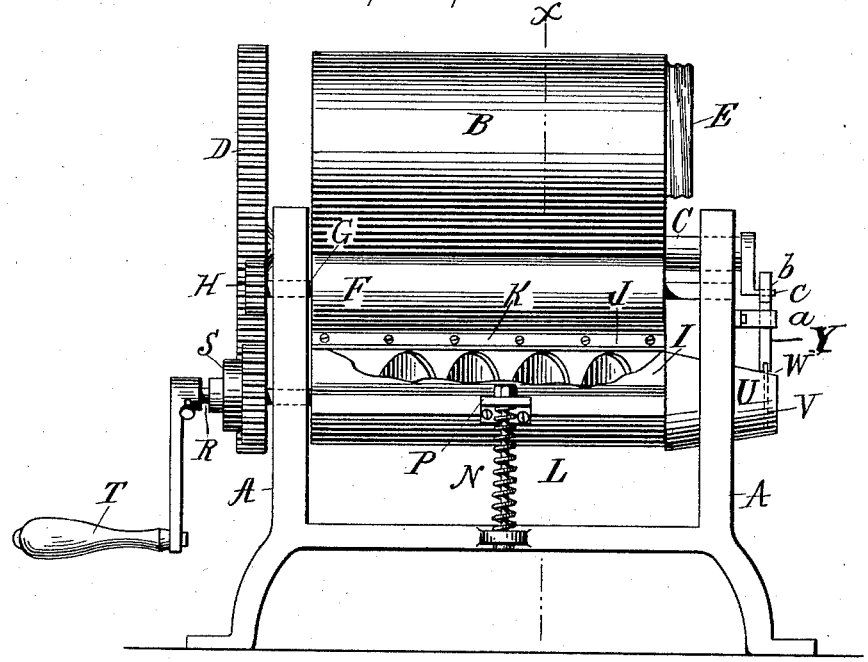
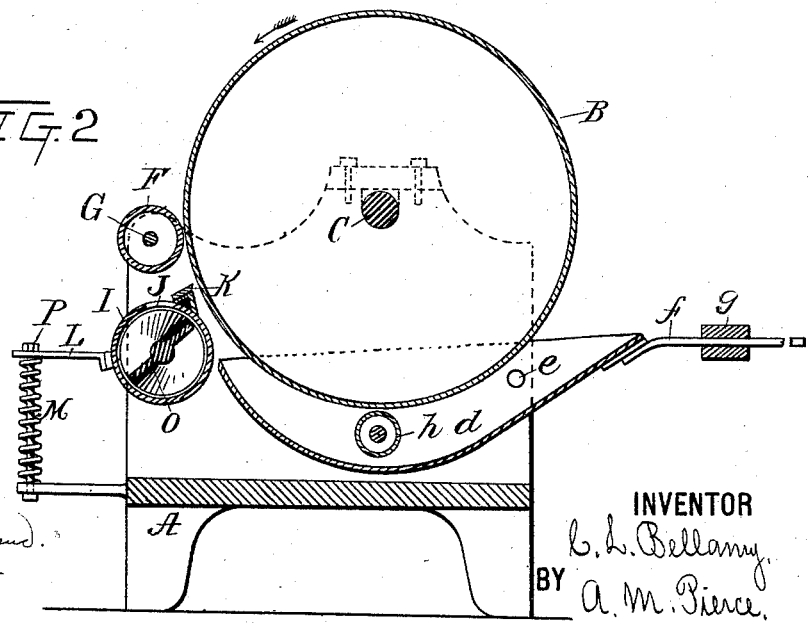
WITNESSES:
Edward C. Rowland
John Buckler
INVENTOR
C. L. Bellamy
BY A. M. Pierce
ATTORNEY

UNITED STATES PATENT OFFICE.

CHARLES L. BELLAMY, OF ARLINGTON, NEW JERSEY.

ICE-CREAM FREEZER.

SPECIFICATION forming part of Letters Patent No. 475,748, dated May 31, 1892.

Application filed December 20, 1890. Serial No. 375,300. (No model.)

*To all whom it may concern:*

Be it known that I, CHARLES L. BELLAMY, a citizen of the United States, residing at Arlington, in the county of Hudson and State of New Jersey, have invented new and useful Improvements in Ice-Cream Freezers, of which the following is a specification.

My invention relates especially to devices employed for freezing ice-cream and similar products by means of a cylinder wherein the freezing mixture is placed, the cream, milk, custard, or other fluid to be frozen being applied to the periphery of said cylinder; and has for its object the provision of a freezer which shall be simple and effective in operation, wherein the cream as it freezes shall be made smooth and the crystals broken up and wherein means are provided for removing the frozen product from the periphery of the freezing-cylinder, compressing the same, and automatically discharging the product in any desired form or shape.

To attain the desired end my invention consists, essentially, in a rotatable cylindrical receptacle or holder for the freezing mixture, a smoothing or grinding roller, an adjustable scraper, a receptacle for the frozen product, means for carrying the cream through said receptacle, compressing the same and discharging the product in predetermined shape or form, and in a holder for the cream to be frozen, provided with means for applying the said cream to the periphery of the freezing-cylinder; and it also involves certain other novel and useful combinations or arrangements of parts and peculiarities of construction and operation, all of which will be hereinafter first fully described, and then pointed out in the claims.

In the drawings, Figure 1 is a front elevation of my improved freezer, and Fig. 2 is a vertical cross-sectional view at line *x x* of Fig. 1.

Like letters of reference, wherever they occur, indicate corresponding parts in both the figures.

A is the main frame of the machine.

B is a cylinder for the reception of the freezing mixture, mounted upon a shaft C, journaled in the frame A.

D is a gear-wheel on one end of the shaft C.

E is a cap screwed upon a collar in the end of the cylinder B for the purpose of charging said cylinder with the freezing mixture and removing the water.

F is a roller mounted upon a shaft G, said shaft being provided with a gear-wheel H, which meshes with the wheel D.

I is a cylinder mounted in the main frame and having a slot J at its upper side.

K is a knife or scraper fixed to the periphery of cylinder I between the cylinder B and the slot J.

L is an arm secured to the front side of cylinder I and extending to a vertical post M, which passes through a perforation in said arm. Beneath the arm is a spring N, and above it is a nut P. The cylinder I may be slightly rotated in its bearings.

O is a screw or worm mounted upon a shaft R, which is journaled in the extremity of cylinder I and is provided with a gear S, which meshes with gear D and with a manipulating-crank T. At the end of cylinder I, opposite to crank T, is an extension U, either cylindrical, square, or of any other desired shape. This extension is open at its outer extremity.

V is a gate, which extends into a slot W in extension U, and Y is a rod secured to gate W, which passes through guides *a* and bears a slotted head *b*.

*c* is a pin or crank secured to the extremity of shaft C.

*d* is a pan pivoted at *e* in each side of the main frame.

*f* is a rod projecting from the pan and provided with an adjustable weight *g*, mounted thereon.

*h* is a roller journaled in the pan, at each side thereof, parallel with the cylinder B.

When constructed and arranged in accordance with the foregoing description, the operation of my device is as follows: The freezing mixture is placed in the cylinder B and the milk or cream to be frozen in the pan *d*, and the rotatable parts are set in motion through the medium of the crank T. The cream in the pan is taken up on the periphery of the cylinder in a thin layer, either directly from the pan or by the intervention of the roller *h*. This roller is so arranged that it just touches the periphery of the freezing-cylinder, and its support being slightly overbalanced it will rest against the said freezing-cylinder in such a manner as to accommodate itself to the thickness of the deposit of cream upon the cylinder and always press upward with a substantially uniform pressure, the degree of pressure being regulated by means of the weight $g$. If the roller were dispensed with and the cylinder allowed to touch the bottom of the cream-containing pan, this pan would exert a gentle pressure in the same manner and would rise and fall in accordance with the thickness of the frozen deposit upon the cylinder. The roller F revolves in close proximity to the freezing-cylinder and is so geared as to move with a much greater speed than said cylinder. The result of this arrangement is that the frozen cream upon the cylinder will be rubbed and ground, the crystals being broken up and the product made smooth and fine.

I have shown only a single roller F; but, if desired, it is obvious that two or more such rollers may be used in conjunction with the freezing-cylinder B without departing from the spirit of my invention. As the cylinder B revolves, the frozen cream upon its periphery will be scraped therefrom by the knife K and fall into the receiver I. The arrangement of the spring N and bar L insures the pressure of the knife upon the cylinder at all times. As the cream falls into the receptacle I it is further mixed and ground by the action of the worm or screw, which at the same time carries the mass toward the discharge, forcing it against the gate or slide V, and this gate is raised and lowered periodically by the bar connected therewith and with the crank upon the shaft C, and when raised the frozen product will be forced outward and cleanly cut into a perfect cake, ready for serving as the gate descends.

Having now fully described my invention, what I claim as new therein, and desire to secure by Letters Patent, is—

1. An ice-cream freezer in which is comprised a main frame, a cylindrical revoluble receptacle for the freezing mixture and means for rotating the same, a holder for the cream to be frozen, pivoted at one side of its center and arranged to be automatically forced upward beneath the cylinder by a counter-balance, a scraper bearing against the receptacle for the freezing mixture, and a conveyer located beneath said scraper, the whole combined and arranged substantially as shown and described.

2. In an ice-cream freezer of the character herein specified, the combination, with a freezing-cylinder, of a mixing-roller mounted in close proximity thereto and arranged to revolve at a speed different from said cylinder, substantially as shown and described.

3. In an ice-cream freezer of the character herein specified, the combination, with the freezing-cylinder, of a pivoted milk or cream holder, and an adjustable weight applied to an extension from said holder, substantially as and for the uses and purpose shown and described.

4. In an ice-cream freezer of the character herein specified, the combination, with the freezing-cylinder, of the adjustable receiving-cylinder, and the scraper mounted thereon, substantially as shown and described.

CHARLES L. BELLAMY.

Witnesses:
A. M. PIERCE,
JOHN BUCKLER.